(12) United States Patent
Monia et al.

(10) Patent No.: US 6,185,651 B1
(45) Date of Patent: Feb. 6, 2001

(54) SCSI BUS EXTENDER UTILIZING TAGGED QUEUING IN A MULTI-INITIATOR ENVIRONMENT

(75) Inventors: Charles Monia, Marlboro; Fee Lee, Framingham; William Ham, Andover, all of MA (US)

(73) Assignee: Compaq Computer Corp, Houston, TX (US)

( * ) Notice: Under 35 U.S.C. 154(b), the term of this patent shall be extended for 0 days.

(21) Appl. No.: 08/965,073

(22) Filed: Nov. 5, 1997

(51) Int. Cl.[7] ........................................... G06F 13/14
(52) U.S. Cl. ..................... 710/240; 710/128; 710/129; 710/107; 710/110; 710/112
(58) Field of Search ........................... 395/306–309, 395/311, 856–858, 882–883, 892; 710/107, 110, 112, 240, 132, 104, 105

(56) References Cited

U.S. PATENT DOCUMENTS

| 5,274,783 | 12/1993 | House et al. | 395/309 |
| 5,414,818 | * 5/1995 | Henson et al. | 395/299 |
| 5,528,765 | * 6/1996 | Milligan | 395/287 |
| 5,564,023 | * 10/1996 | Young | 395/309 |
| 5,619,661 | * 4/1997 | Crews et al. | 395/299 |
| 5,664,221 | * 9/1997 | Amberg et al. | 395/829 |
| 5,708,784 | * 1/1998 | Yanai et al. | 395/299 |
| 5,778,235 | * 7/1998 | Robertson | 395/728 |
| 5,835,739 | * 11/1998 | Bell et al. | 395/308 |

FOREIGN PATENT DOCUMENTS 2 021 824   12/1979   (GB).

* cited by examiner

Primary Examiner—Ayaz R. Sheikh
Assistant Examiner—Raymond N Phan
(74) Attorney, Agent, or Firm—William J. Kubida; Hogan & Hartson L.L.P.

(57) ABSTRACT

A SCSI bus extender apparatus coupling a main SCSI bus to a auxiliary SCSI bus includes a mechanism for detecting and processing SELECTION and RESELECTION signals transmitted between the two buses to accommodate target devices on the auxiliary bus which support tagged queuing in accordance with the SCSI protocol. The invention contemplates reserving an address on the auxiliary bus for each initiator on the main bus and performing the appropriate address conversions to enable target devices to properly identify the correct initiator device during a RESELECTION phase.

12 Claims, 6 Drawing Sheets

SCSI BUS EXTENDER UTILIZING TAGGED QUEUING IN A MULTI-INITIATOR ENVIRONMENT

FIELD OF THE INVENTION

The invention generally relates to computer systems, and, more particularly, to input/output interfaces used to connect peripheral devices to a digital computer.

COPENDING APPLICATIONS

This application is the one of two patent applications filed on an even date herewith and commonly assigned, including U.S. patent application Ser. No. XX/XXX,XXX, entitled "SCSI Bus Extender Abitration Apparatus and Method." The subject matter of the above-identified copending patent application is incorporated herein by reference.

BACKGROUND OF THE INVENTION

The well recognized Small Computer System Interface ("SCSI") standards of the American National Standards Institute (ANSI X3.131-1986) specify the electrical, mechanical and logical characteristics of an input/output (I/O) bus interface for coupling physically small computers with other small computers and peripheral devices. Such peripheral devices may include, for example, disk drives, tape drives, printers, compact disk read-only memories, and scanners. The SCSI standards are available from the American National Standards Institute, Inc., New York, N.Y., U.S.A., and are incorporated herein by reference.

The SCSI standards generally specify an I/O bus, which commonly is referred to as a "SCSI bus." Instead of requiring a separate bus controller, a SCSI bus utilizes a SCSI bus protocol, specified by the SCSI standards, that is implemented distributively within either central processing units, host adapters of computers on the bus, and/or controllers of peripheral devices on the bus.

SCSI bus protocol provides means for the transfer of information between a pair of devices attached to the bus. This information is usually associated with the execution of device input-output commands, such as read or write. To enable the transfer of information, the bus protocol includes an addressing mechanism for identifying the devices and establishing a pathway or connection between them for the movement of command data. The addressable entities that participate in a connection are:

The initiator: The bus device originating the connection.
The target: The bus device to which the connection is directed.
The logical unit: An I/O device attached to the target, which services the I/O command.

A bus device is physically connected to the SCSI bus and is referenced by specifying its bus I/D as described in the SCSI standard. A SCSI bus may contain up to 16 bus devices having bus I/Ds 0 through 15. At least one bus device must be capable of performing initiator operations.

The I/O operation is executed by a logical unit attached to the target. The SCSI standard allows up to 32 logical units per target. Logical units are addressed by means of a logical unit number or LUN which is sent by special control messages during the MESSAGE IN or MESSAGE OUT phases described below. A connection is fully specified by a triplet consisting of the initiator bus ID, the target bus ID and the logical unit number of the I/O device attached to the target.

The connection between a pair of devices may have one of the following states:

ACTIVE: The connection is established over the bus such that data can be physically transferred between the source and destination.

LATENT: The connection exists but the shared physical resources needed for the transfer of data are free or in use by other connections.

NONEXISTENT: The connection does not exist.

According to the SCSI standard, a bus device alters connection state through the series of bus phases set forth below.

ARBITRATION: The process through which a bus device obtains exclusive access to the bus in order to create or reestablish a connection.

SELECTION: The process through which an initiator alerts a target device that a connection is to be formed.

MESSAGE OUT: The transfer of connection control information from the initiator to the target. During connection creation, the message data contains the identity of the logical unit, i.e. the logical unit number.

RESELECTION: The process through which the target alerts the initiator that a connection is to be reestablished.

MESSAGE IN: The transfer of connection control information from the target to the initiator. Used by the target when the connection is reactivated to send the logical unit number of the I/O device.

In the SCSI standard, the bus device creating a connection is called the initiator. The bus device to which the connection is directed is called the target. As described in the SCSI standard, a connection comes into existence through the sequence of ARBITRATION, SELECTION and MESSAGE OUT phases, referred to hereinafter as the SELECT-MESSAGE OUT operation.

After arbitrating for the bus, the initiator enters the SELECTION phase and notifies the intended target by asserting its bus I/D as specified in the SCSI standard. Upon receiving the expected target response, the initiator passes control of the bus to the target. The target then solicits the logical unit number by placing the bus in the MESSAGE OUT phase and fetching the appropriate control message from the initiator. At this point, the connection enters the ACTIVE state and data specifying the command to be processed is sent to the logical unit.

While processing a command, it is usually the case that the logical unit must perform some preliminary work, such as a seek to a particular disk sector and track, before actual data transfer can take place. Since the bus is not needed during this time, the target will release control so the bus can be used to service other connections. In this case, the target relinquishes the bus and places the connection in the LATENT state using the messages and signals specified in the SCSI standard.

When the physical transfer of data is required, the target places the latent connection in the ACTIVE state through the sequence of ARBITRATION, RESELECTION and MESSAGE IN phases specified in the SCSI standard, collectively referred to hereinafter as the RESELECT-MESSAGE IN operation.

To reactivate a connection, the target arbitrates for the bus then enters the RESELECTION phase. During this phase, the target notifies the initiator that a connection is to be reestablished by asserting the initiator's bus ID. Upon receiving the expected initiator response, the target completes reactivation by entering the MESSAGE IN phase and passing the logical unit number to the initiator. At this point, the transfer of command data can be continued. Upon completion of data transfer, the target terminates the connection by placing it in the NONEXISTENT state using the signals and messages described in the SCSI standard.

The technical benefits of SCSI-based I/O systems have led developers to build systems of ever increasing complexity and storage capacity. As the demand for storage capacity increases, the limitation on the number of addressable bus devices becomes a severe constraint on the size and storage capacity that can be achieved. For that reason, the technique for extending bus connectivity described in U.S. Pat. No. 5,274,783 (House et al.) was developed. This patent, the subject matter of which is incorporated herein, in its entirely, by reference, is assigned to Digital Equipment Company. It describes a means for increasing connectivity by using a bus bridge or extender to expand the number of bus devices that can be addressed.

A bus extender environment consists of the following elements:
  i. Provisions for connection to a main SCSI bus.
  ii. An auxiliary SCSI bus, to which as many as 15 targets may be attached.
  ii. Logic for forming a connection between initiators attached to the main bus and targets attached to the auxiliary bus, in a manner that is transparent to the targets and initiators.

A main bus can have up to 15 extenders and each extender may have up to 15 targets attached. As a result, the number of bus devices that can be connected to an I/O system is increased from a maximum of 16 to a maximum of 241, 15 extenders each having 15 targets; plus one initiator on the main bus.

To the main bus initiator, the extender achieves transparency by presenting the auxiliary bus devices as if they were logical units attached to a target device e.g. the extender. Conversely, to a target device on the auxiliary bus, the extender achieves transparency by behaving as if it were the real initiator on the main bus.

When a connection is created or reactivated, the extender intervenes to form the path from the main bus initiator to the auxiliary bus target. This is done by forming two separate partial connections: one between the initiator on the main bus and the extender and the other from the extender to the target on the auxiliary bus. The partial connections are then joined together to create a single physical path. Once the path is formed, the extender simply acts as a conduit for the transfer of data.

The process of creating a connection between the main bus initiator and an auxiliary bus target is as follows:

1. The initiator performs a SELECT-MESSAGE OUT operation referencing the main bus address of the extender as the target.
2. The extender reads the logical unit number contained in the message data and stores the initiator bus ID in a table indexed by this logical unit number.
3. The extender converts the logical unit number to the bus ID of the target on the auxiliary bus.
4. The extender completes the connection by performing a SELECT-MESSAGE OUT operation referencing the target on the auxiliary bus. The logical unit number in the message data is set to zero.
5. After the connection is established, the extender shuttles data between the main and auxiliary busses.

The process of reactivating a latent connection involves reconnecting the target on the auxiliary bus to the initiator on the main bus as follows:

1. The target performs a RESELECT-MESSAGE IN operation referencing the auxiliary bus ID of the extender as the initiator.
2. The extender does a 'reverse translation' to convert the target I/D to the logical unit number supplied by the main bus initiator in step 2 above. Using this value, the extender does a table lookup to recover the initiator main bus ID that was stored in step 2.
3. The extender performs a RESELECT-MESSAGE IN operation using the bus ID of the main bus initiator. After the logical unit number is returned during the MESSAGE IN phase, the connection is complete. The extender then shuttles data between the main and auxiliary busses as described above.

In a system with several main bus initiators, the method for recovering the initiator bus ID during step 2 of the reselection process effectively restricts the auxiliary bus target to no more than one connection at a time. Multiple connections, each from a different initiator cannot be accommodated since there is no way to retrieve the proper initiator bus ID by the table lookup method described.

Unfortunately this places an unacceptable restriction on the use of modern SCSI devices, which improve throughput by a technique referred to in the SCSI standard as "tagged command queuing". To use this method, the device must have one connection in existence for each pending command. Since several commands from different initiators may be in progress at any one time, the inability to support this mode of operation places unacceptable restrictions on multi-initiator systems.

Accordingly, a need exists for a method, apparatus, and computer program product that facilitates the use of the tagged command queuing method between initiators and targets whose respective busses are connected via a bus extender.

SUMMARY OF THE INVENTION

The invention contemplates reserving an address on an auxiliary SCSI bus for each initiator device located on a main SCSI bus and connected to the auxiliary SCSI bus by a bus extender apparatus. During the SELECTION MESSAGE OUT operation the bus extender modifies the address of the initiator device in the asserted SELECTION signal to the reserved address on the auxiliary bus associated with that initiator device. During the RESELECTION MESSAGE IN operation, the bus extender converts the reserved address on the auxiliary bus to the actual address of the corresponding initiator device on the main bus. In this manner, target devices on the auxiliary bus are able to support tag command queuing as defined in the SCSI protocol where multiple initiator devices reside on the main bus.

In accordance with a first aspect of the present invention, in a bus extender apparatus operatively coupling a main SCSI us to an auxiliary SCSI bus a method comprises the steps of reserving an address on the auxiliary SCSI bus for each initiator device, detecting a SELECTION signal asserted by an initiator device on the main bus, modifying the SELECTION signal, and asserting the modified SELECTION signal on the auxiliary bus. The step of modifying the SELECTION signal, in one embodiment, comprises converting the address of the initiator device in the SELECTION signal to a reserved address from the auxiliary bus associated with the initiator device. In another embodiment, the method includes the further steps of detecting a RESELECTION signal asserted by a target device on the auxiliary bus, modifying the RESELECTION signal and asserting the modified RESELECTION signal on the main bus. The step of modifying the RESELECTION signal may comprise the step of converting the reserved address in the RESELECTION signal to the address of the associated initiator device on the main bus.

In accordance with a second aspect of the invention, a computer program product for use with a bus extender apparatus operatively coupling a main SCSI bus to an auxiliary SCSI bus includes a computer program product having computer useable program code embodied on the medium, the program code comprising code for associating with each initiator device a reserved address on the auxiliary bus, program code for detecting a SELECTION signal asserted by an initiator device, program code for modifying the SELECTION signal, and program code for asserting the modified SELECTION signal on the auxiliary bus. In one embodiment, the computer program product further comprises program code for detecting a RESELECTION signal asserted by a target device, program code for modifying the RESELECTION signal and program code for asserting the modified RESELECTION signal on the main bus.

In accordance with a third aspect of the invention, a bus extender apparatus for operatively coupling a main SCSI bus to an auxiliary SCSI bus comprises a memory device for storing a reserved address on the auxiliary bus for each initiator device having access to the auxiliary bus, means for detecting a SELECTION signal asserted by an initiator device on the main bus, means for modifying the SELECTION signal and means for asserting the modified SELECTION signal on the auxiliary bus. In one embodiment, the apparatus further comprises means for detecting a RESELECTION signal asserted by a target device, means for modifying the RESELECTION signal and means for asserting the modified RESELECTION signal on the main bus.

In accordance with the fourth aspect of the present invention a bus extender apparatus operatively coupling a first plurality of devices on a first bus and a second plurality of devices on a second bus comprises means for associating with each of the first plurality of devices a physical address on the first bus and a reserved address on the second bus. The apparatus further comprises means for translating the physical address of one of the plurality of first bus devices to the reserved address for communications intended for an auxiliary bus device, and, means for translating a reserved address to a physical address for communications intended for a first bus device.

BRIEF DESCRIPTION OF THE DRAWINGS

For a fuller understanding of the nature and objects of the invention, reference should be made to the following detailed description, taken in conjunction with the accompanying drawings, in which.

DETAILED DESCRIPTION

Figure 1:
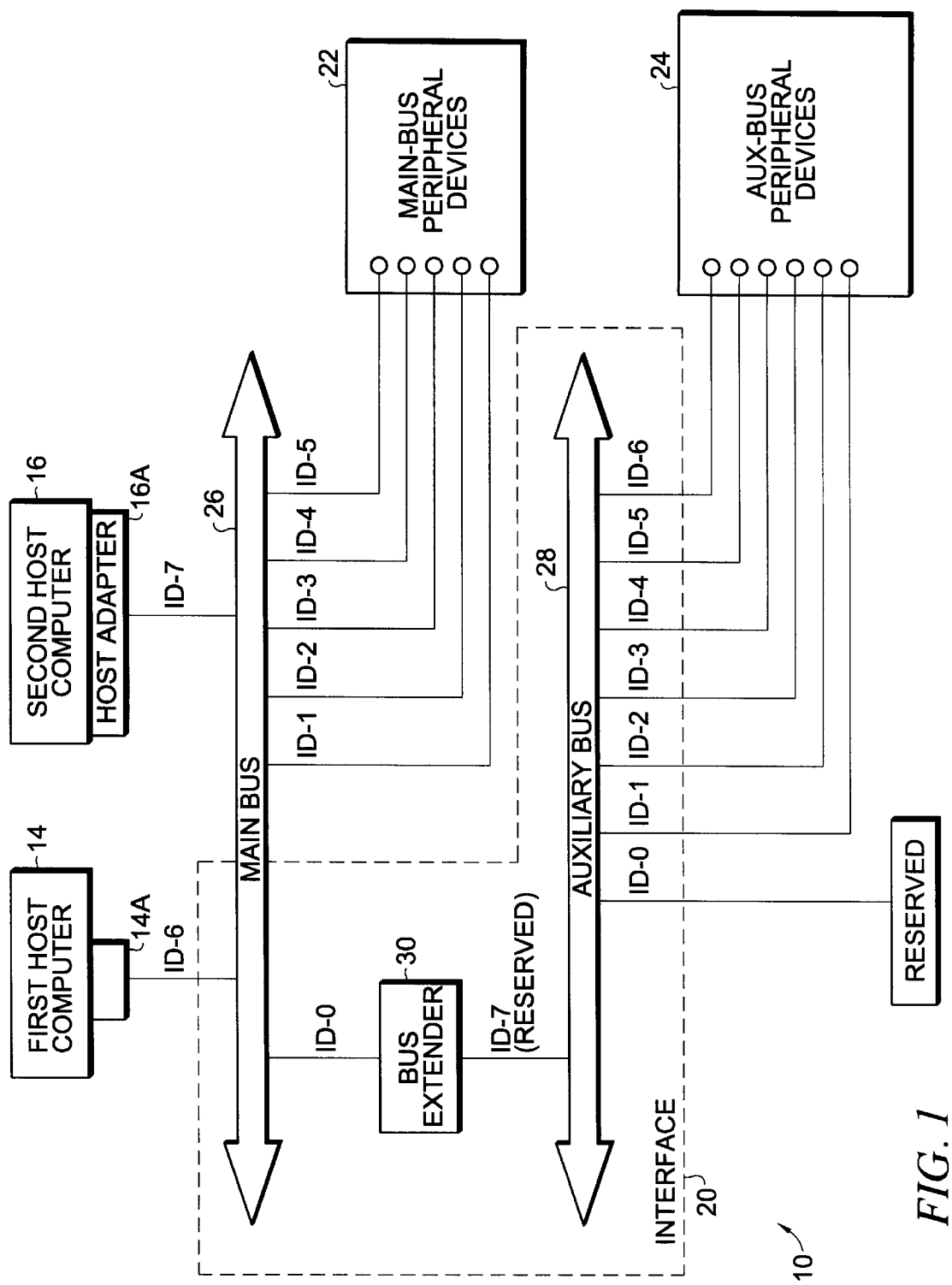
FIG. 1 is a block diagram of a computer system having a SCSI interface including main and auxiliary buses interconnected by a bus extender in accordance with the present invention.

FIG. 1 shows a computer system 10 that may be used with an illustrative embodiment of the invention for interpreting and processing SELECTION signals transmitted via the known tagged queuing method. The computer system 10 includes first and second host computers 14 and 16 interconnected by a SCSI interface 20. The SCSI interface 20 includes a main SCSI bus 26 connected to the host computer 14, the auxiliary computer 16 and a first set of SCSI-conforming peripheral devices 22. The SCSI interface 20 also includes a auxiliary SCSI bus 28 connected to a second set of five SCSI-conforming peripheral devices 24. The SCSI interface 20 also includes a bus extender 30 (hereinafter "bridge 30") for interconnecting the main and auxiliary buses 26, 28. Host computer 14 is connected to the main bus 26 via a conventional SCSI port 14A. Alternatively, host computer 16 is connected to main bus 26 via a host adapter 16A incorporating such a port. Among other functions, the interface 20 is responsible for transferring digital signals between the host computers 14, 16 and the auxiliary-bus peripheral devices 24.

Both computers 14, 16 and each main-bus peripheral device 22 have a unique address on the main bus 26. Such addresses are specified in the drawings as ID_0 through ID_7. Analogously, each of the auxiliary-bus peripheral devices 24 has a unique address on the auxiliary bus 28. Such addresses also are specified in the drawings as ID_1 through ID_6. ID_0 and ID_7 are reserved as discussed below.

The bridge 30 also occupies a unique address on each of the main and auxiliary buses 26, 28. For example, the bridge 30 has a main bus address of ID_0 and a auxiliary bus address of ID_7. The bridge address on the auxiliary bus can be included in the set of auxiliary bus reserved addresses. The specific assignment of address IDs can be varied by those skilled in the art, although priority during signal contention on the buses as discussed below should be taken into consideration during ID assignment.

The particular configuration of the computer system 10 of FIG. 1 is for illustrative purposes only. Any combination of computers and main bus peripheral devices can be used in conjunction with the invention as long as at least one initiator is connected to the main bus. For instance, a single computer and seven peripheral devices could be connected to the main bus.

The peripheral devices 22 and 24 can be implemented with any commercially available units adhering to the SCSI standards. As long as such units conform to the SCSI standards, such peripheral devices need not be specifically adapted or modified in terms of either hardware or software for use in conjunction with the invention.

Data signals may be transmitted from the computers 14 and 16, i.e. initiators, to the peripheral devices 24 on the auxiliary bus 28, i.e. targets, by means of the SELECTION-MESSAGE OUT operation as defined in the SCSI specification. Alternatively, targets may re-select an initiator to continue a previously interrupted transmission from such initiator by means of a RESELECTION MESSAGE IN operation, as defined in the SCSI specification.

Figure 2:
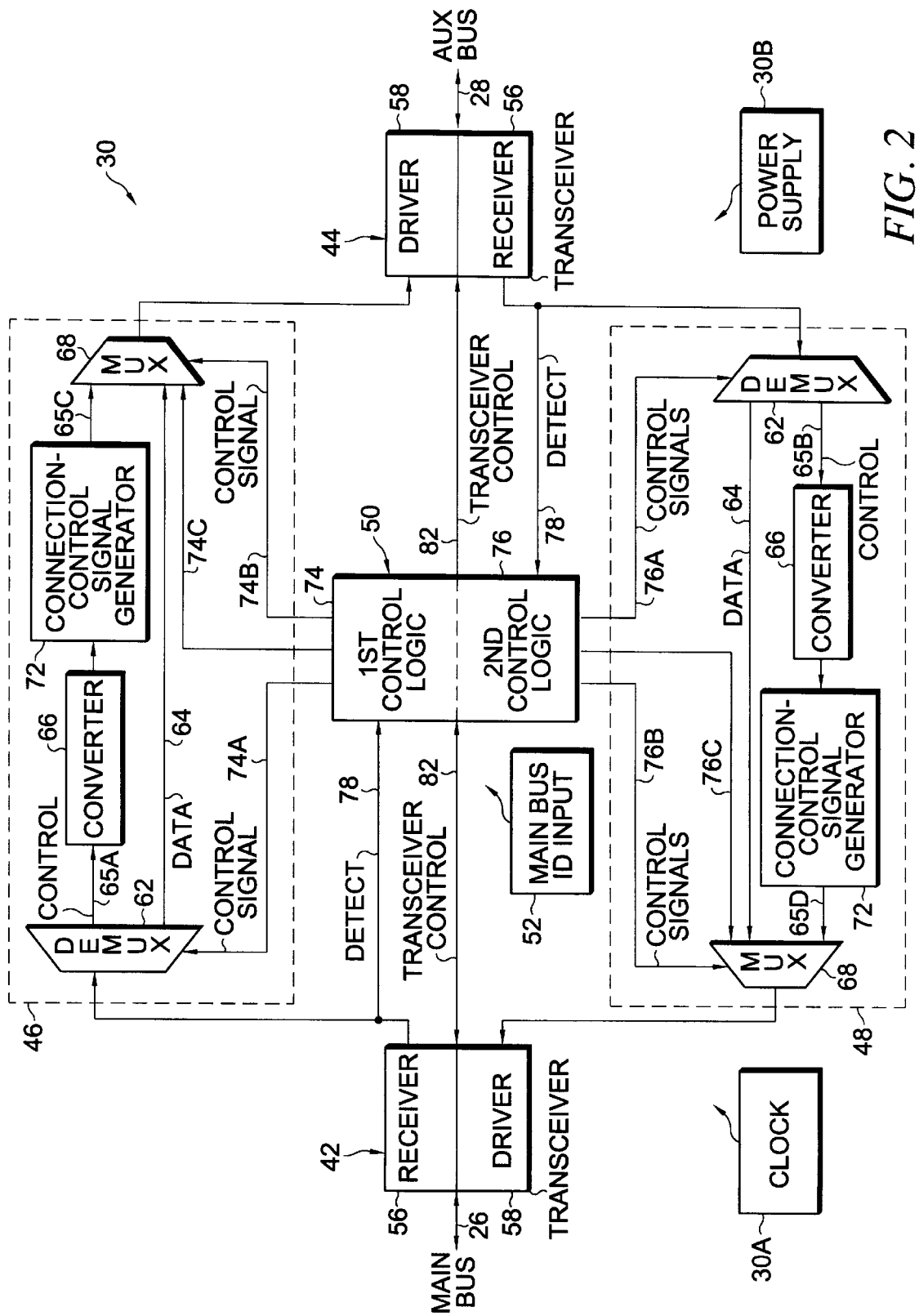
FIG. 2 is a block diagram of an illustrative embodiment of a bus extender bridge in accordance with the invention.

FIG. 2 shows a block diagram of an illustrative bridge 30 in accordance with the present invention. Bridge 30 includes a main bus 26 and auxiliary-bus transceivers 44, transfer circuits 46, 48 for selectively passing signals between the main bus transceiver 42 and the auxiliary-bus transceiver 44, and control logic 50 for controlling the operation of the other components of the bridge 30. The bridge 30 also has a main bus ID-input logic 52, such as a group of switches, which permits a user to manually enter, and then store, a main bus ID identifying the bridge 30. In addition, the bridge 30 has a clock 30A for providing timing signals, and a power supply 30B.

Each transceiver 42, 44 has a receiver 56 for receiving signals from the respective originating buses 26, 28, and a driver 58 for sending or asserting signals on the respective target buses 28, 26. The transceivers 42, 44 can be either both differential or both single-ended transceivers, or one can be differential and the other single-ended, and, in any event, should conform with the type of signal lines on the bus 26, 28 to which each transceiver 42, 44 is connected.

Each transfer circuit 46, 48 modifies certain signals, i.e., connection-control signals, received by the transceivers 42, 44, and passes other signals, i.e., message data signals, without modification. Each transfer circuit 46, 48 has a demultiplexer 62 ("DEMUX") for receiving the received signals at a data input thereof from its respective transceiver 42 or 44 and, in response to a control signal at a control input thereof, for passing the message data signals onto direct data lines 64 connected to a first output of the DEMUX 62 and passing the connection-control signals 65A or 65B to a converter 66 connected to a second output of the DEMUX 62. The direct data lines 64 of the transfer circuit 46, 48 directly couple the message data signal passed by the DEMUX 62 to a multiplexer 68 ("MUX") at a first data input thereof.

The converters 66 translate the ID and LUN field data of the connection-control signals 65A, 65B into appropriate ID and LUN field data for use on the destination bus 28, 26, in conformance with the address specifications of the SCSI standards. The converter 66 then passes the generated ID and LUN field data to the connection-control signal generator 72, which generates connection-control signals 65C, 65D suitable for use on the bus 28, 26 that is to receive the communication. The operation of the converters 66 and signal generators 72 of the transfer circuits 46, 48 is described in more detail below and in the previously referenced patent.

The connection-control signals 65C, 65D generated by the signal generator 72 of the transfer circuit 46, 48 are applied to the MUX 68 at a second data input thereof. Responsive to a control signal 74B, 76B at a control input thereof, the MUX 68 passes either the message data signals received over the direct data lines 64, the connection-control signals 65C, 65D, or signals 74C, 76C generated by the control logic 50 (as described hereinafter), to the driver 58 of transreciever 42, 44.

The control logic 50 includes first and second control logic modules 74, 76, respectively, which, among other functions, (I) monitor (via detect lines 78) signals received by the transceivers 42, 44, and, in response thereto, (ii) control the direction of the transceivers 42, 44 i.e., whether the transceivers are driving or receiving signals using transceiver control lines 82, (iii) control the operation of the DEMUXs 62 and the MUXs 68 by applying thereto appropriate control signals 74A, 74B, and 76A, 76B, and (iv) assert signals 74C, 76C to third data inputs of MUXs 68 to be sent over the target buses.

Figure 3:
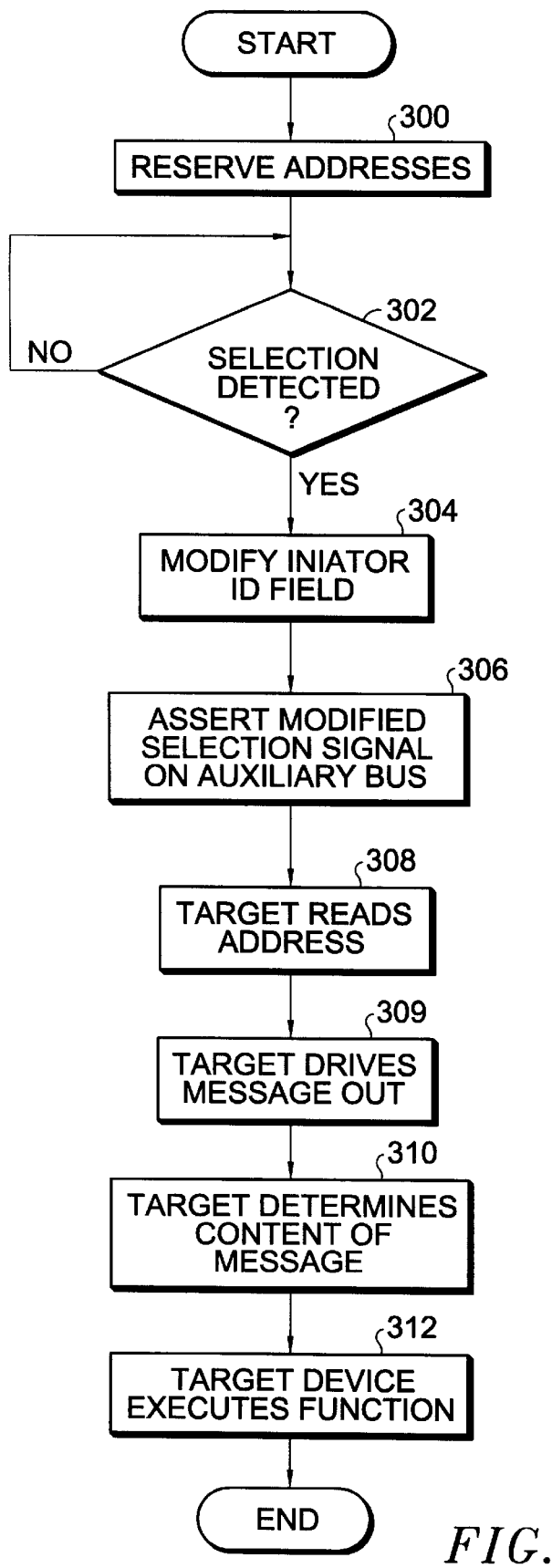
FIG. 3 is a flow chart illustrating the method steps performed by the bus extender of the present invention during the SELECTION phase.

The control logic 50 processes SELECTION signals in accordance with the method illustrative in FIG. 3 and may be implemented economically through the use of application-specific integrated circuitry (ASIC). Alternatively, controller logic 50 may comprise a programmable logic array or logic devices. The transfer circuits 46 and 48 also may be implemented using ASIC.

FIG. 3 is a flow chart illustrating the process for interpreting and processing a SELECTION signal transmitted across the bridge 30 in accordance with the present invention. The process begins with step 300 in which an address is reserved on the auxiliary bus for both of the computers 14 and 16. For illustrative purposes, the computer 14 will be considered to be the initiator transmitting a SELECTION signal. Once the bridge 30 detects the SELECTION signal from the computer 14 (step 302), bridge 30 determines the reserved address on the auxiliary bus 28 assigned to the computer 14. Once determined, the bridge 30 modifies the initiator address field in the address portion of the SELECTION signal, thereby producing a converted SELECTION signal, as illustrated by procedural step 304. A description of the address portions of a SELECTION signal, including the initiator address field can be found in the SCSI specification.

At step 306, the converted SELECTION signal is directed to the intended target. The target reads the address information, as illustrated by step 308 and drives a MESSAGE OUT signal on the auxiliary bus in accordance with the SCSI specification as illustrated by step 309. The target device then accesses its local memory (not shown) and determines the content, e.g., the command of the message, in the signal also in accordance with the SCSI protocol (step 310). At step 312, the target executes the function specified in the message such as, for example, a write command, thus ending the process. Step 312 also is executed in accordance with defined SCSI protocol.

The process of FIG. 3 is effective for use with multiple initiators because the target receives the reserved addresses on the auxiliary bus 28 associated with the initiator device asserting the SELECTION signal. Accordingly, the targets do not receive the address of the bridge 30, as disclosed in the House et al. patent which does not identify which initiator transmitted the SELECTION signal, and, therefore, prohibits utilization of tagged queuing.

Figure 4:
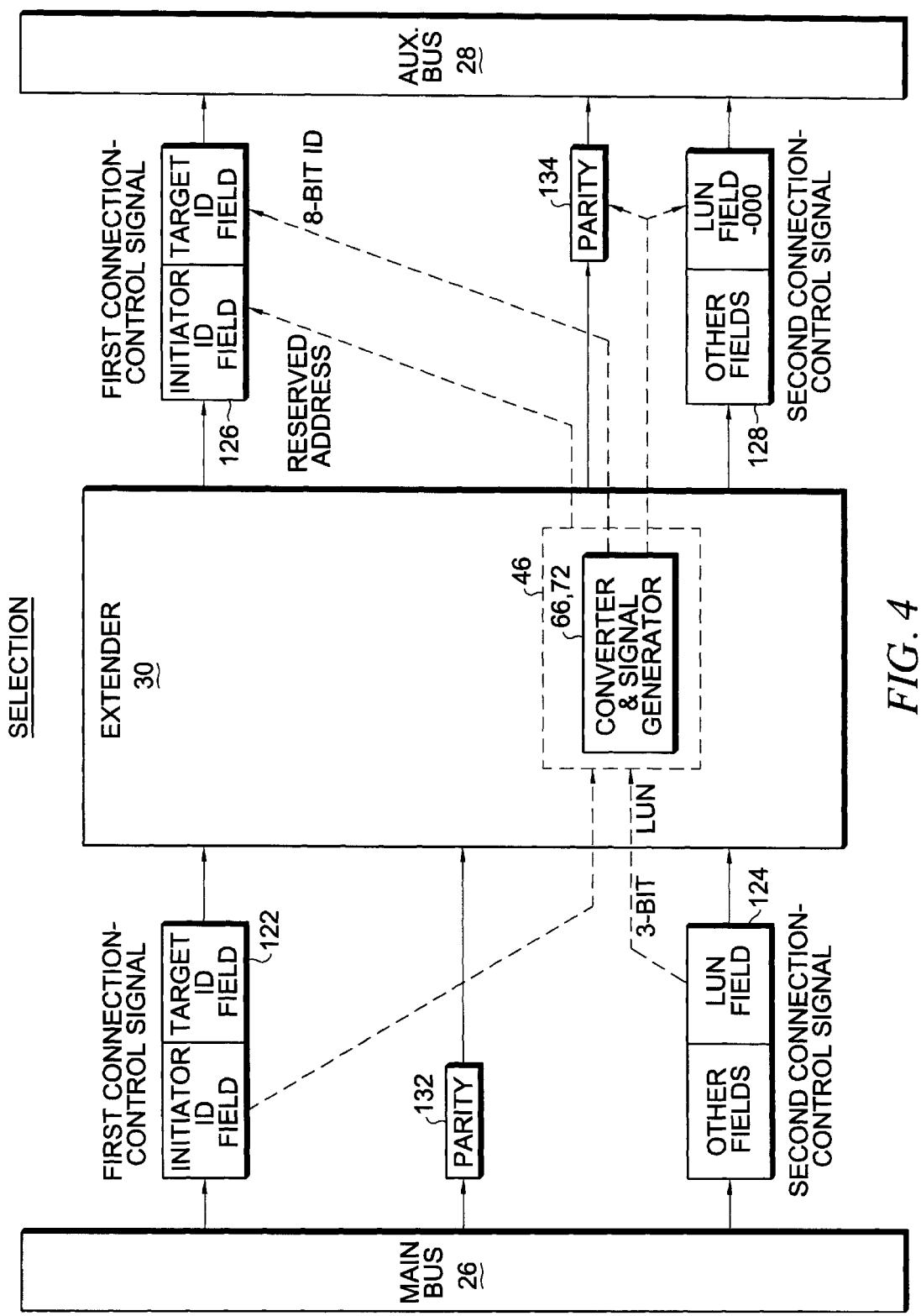
FIG. 4 is a diagrammatic representation of the modification of the connections control signals by the bus extender of the present invention of FIG. 2 during the SELECTION phase.

FIG. 4 illustrates diagrammatically the operation of the bridge 30 during processing of SELECTION signals. More specifically, as shown in FIG. 4, first and second main bus connection control signals 122, 124 are received from the main bus 26 by the bridge 30. The bridge 30 uses the data in these signals to generate auxiliary-bus first and second connection control signals 126, 128 to be sent over the auxiliary bus 28. The main bus first connection-control signal 122 has an initiator ID field providing the ID of the initiator, e.g. host computer 14, that originated the communication, and a target ID field that provides the ID of the bridge 30 so as to identify the bridge 30 as the intended recipient on the main bus 26 of the communication. Converter 66, of transfer circuit 46, in the illustrative embodiment, may include a plurality of writable registers in to which the reserved address for each initiator on the main bus may be written or programmed. As illustrated in FIG. 4, converter 66 converts the initiator ID field of the first connection-control signal 122 into the corresponding reserved address on the auxiliary bus in the form of initiator ID field of the first connection-control signal 126. In the block diagram of FIG. 4 there is no latch necessary to retain the initiator ID field, as was implemented in the bridge disclosed in the House et al. patent.

The second connection-control signals 124 correspond, for example, to IDENTIFY signals under the SCSI standards, and include a LUN field which, for purposes of the invention, specifies the ultimate target peripheral, e.g. device 24, on the auxiliary bus 28. The host computer 14 thus is responsible for identifying both the bridge 30 and the ultimate recipient of the communication in the main bus connection-control signals.

The converter 66 of the transfer circuit 46 translates the LUN field data of the received second connection-control signal 124 into an address on the auxiliary bus 28 for incorporation into auxiliary bus first connection-control signal 126. The converter 66 of circuit 46 also initializes the LUN field data to a predetermined value of zero, for example, for incorporation into a auxiliary-bus second connection-control signal 128.

In addition, the bridge 30 assures that the parity bit 132 provided by the SCSI standards is correct for the generated IDENTIFY message. Specifically, the bridge 30 modifies the parity bit 132 received from the main bus 26 based on whether the change in the value of the LUN field changed the parity for the LUN field i.e., from even to odd, or odd to even, and provides the modified parity bit 134 to the auxiliary bus 28. Accordingly, the bridge 30 changes the parity of the IDENTIFY message based solely on the LUN field data. The remaining functions of bus extender 30 during the SELECTION-related phases operate substantially similar to that described in U.S. Pat. No. 5,274,783.

Figure 5:
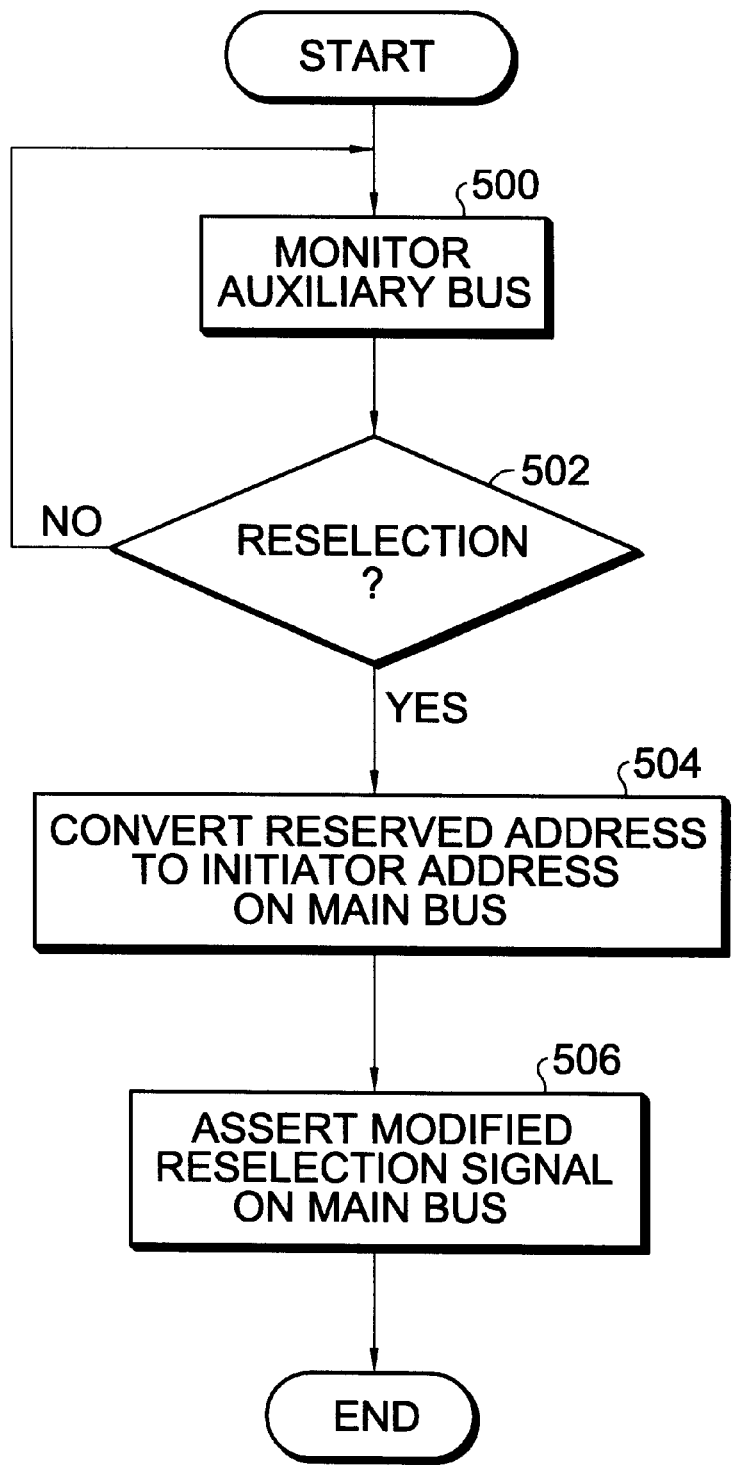
FIG. 5 is a flow chart illustrating the method steps perform by the bus extender of the present during the RESELECTION phase.

FIG. 5 is a flow chart illustrating the process for interpreting and processing a RESELECTION signal to the initiator, i.e., computer 14, transmitted across the bridge 30 in accordance with the present invention. The process begins at step 500 in which the bridge 30 is in "monitor mode." When in this mode, bridge 30 monitors the auxiliary bus 28 for RESELECTION signals directed to any of the reserved addresses i.e., initiator addresses on the auxiliary bus 28, as illustrated by step 502. If such a signal is detected, the initiator address information in the RESELECTION signal is converted to the corresponding address of the initiator on the main bus 26, as illustrated by step 504. Once converted, the bridge then directs or asserts the modified RESELECTION signal on the main bus for detection by the appropriate initiator, e.g. computer 14, in accordance with the SCSI protocol and as illustrated by step 506.

Figure 6:
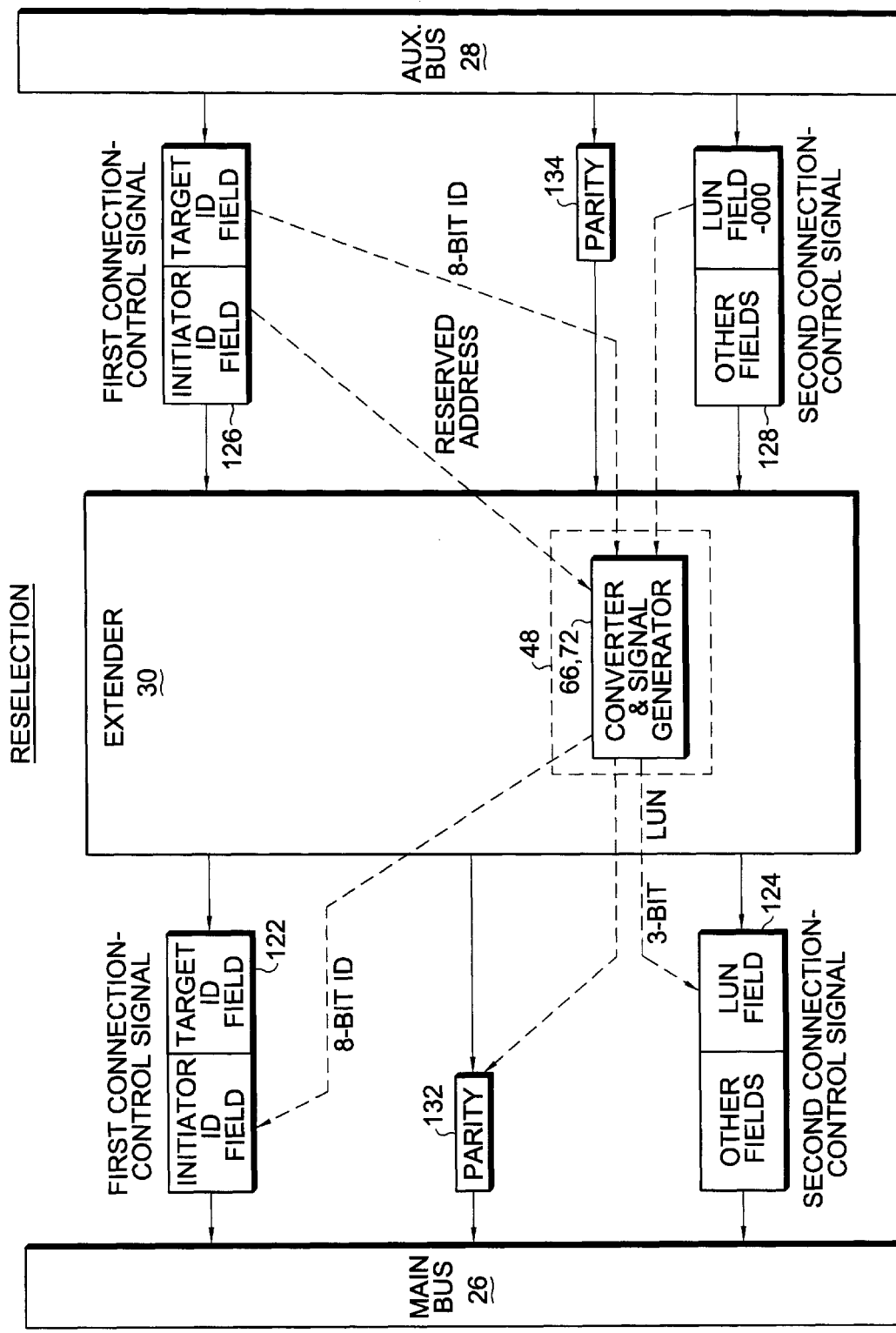
FIG. 6 is a diagrammatic representation of the modification of the connection control signals by the bridge of FIG. 2 during the RESELECTION phase.

FIG. 6 illustrates diagrammatically the operation of the bridge 30 during processing of RESELECTION signals. More specifically, as shown in FIG. 6, first and second main bus connection control signals 126, 128 are received from the auxiliary bus 28 by the bridge 30. The bridge 30 uses the data in these signals to generate main bus first and second connection control signals 122, 124 to be sent over the main bus 26. The auxiliary bus first connection-control signal 126 has an initiator ID field providing the reserved address associated with ID of the initiator, e.g. host computer 14, that originated the communication, and a target ID field that provides the ID of the target. The bridge responds to the reserved I/D and establishes a connection with the intended recipient of the communication on the main bus 26. Like transfer circuit 46, converter 66 of transfer circuit 48, in the illustrative embodiment, may include a plurality of writable registers into which the address of the initiator associated with each reserved address on the auxiliary bus may be written or programmed. As illustrated in FIG. 6, converter 66 converts the reserved address, in the form of an initiator ID field, of the first connection-control signal 126 into the corresponding initiator ID on the main bus of the first connection-control signal 126. The remaining functions of bus extender 30 during the RESELECTION-related phases operate substantially similar to that described in U.S. Pat. No. 5,274,783. A software implementation of the above described embodiment(s) may comprise a series of computer instructions either fixed on a tangible medium, such as a computer readable media, e.g. diskette, CD-ROM, ROM, RAM, ASIC, Programmable Logic Array, programmable registers or fixed disk, or transmittable to a computer system, via a modem or other interface device. The medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. In a bus extender apparatus operatively coupling a main SCSI bus to an auxiliary SCSI bus, the main bus having at least one initiator device operatively coupled thereto, each of the at least one initiator device accessible by an address on the main bus, the auxiliary bus having at least one target device operatively coupled thereto, the target device supporting tagged queuing, and the target device accessible by an address on the auxiliary bus, a method comprising the steps of:

A. reserving an address on the auxiliary bus for each initiator device of the at least one initiator device having access to the auxiliary bus;

B. detecting at the bus extender apparatus a main bus SELECTION signal asserted by an initiator device on the main bus, the main bus SELECTION signal including an initiator address field containing the address of the initiator device which asserts the main bus SELECTION signal;

C. modifying the SELECTION signal to form a modified SELECTION signal including a modified initiator address field containing the address of the initiator device which asserts the main bus SELECTION signal reserved during said step of receiving; and D. asserting the modified SELECTION signal on the auxiliary bus.

2. The method of claim 1 further comprising the steps of:

E. detecting a RESELECTION signal asserted by a target device on the auxiliary bus;

F. modifying the RESELECTION signal; and

G. asserting the modified RESELECTION signal on the main bus device.

3. The method of claim 2 wherein the RESELECTION comprises a reserved address on the auxiliary bus associated with the initiator device.

4. The method of claim 3 wherein step F comprises:

F.1 converting the reserved address in the RESELECTION signal to the address of the initiator device on the main bus.

5. A computer program product for use with a bus extender apparatus, the bus extender apparatus operatively coupling a main SCSI bus to an auxiliary SCSI bus, the main bus having at least one initiating device operatively coupled thereto, each of the at least one initiator device accessible by an address on the main bus, the auxiliary bus having at least one target device operatively coupled thereto, the target device supporting tagged queuing and the target device having an address on the auxiliary bus, the computer program product comprising a computer usable medium having program code embodied in the medium, the program code comprising:

A. program code for associating with each initiator device having access to the auxiliary bus, a reserved address on the auxiliary bus;

B. program code for detecting a main bus SELECTION signal asserted by an initiator device on the main bus the main bus SELECTION signal including an initiator address field containing the address of the initiator device which asserts the main bus SELECTION signal;

C. program code for modifying the SELECTION signal to form a modified SELECTION signal including a modified initiator address field containing the address of the initiator device which asserts the main bus SELECTION signal reserved during said step of reserving; and D. program code for asserting the modified SELECTION signal on the auxiliary bus.

6. The computer program product of claim 5 further comprising:

E. program code for detecting a RESELECTION signal asserted by a target device;

F. program code for modifying the RESELECTION signal; and

G. program code for asserting modified the RESELECTION signal.

7. The computer program product of claim 6 wherein the RESELECTION signal comprises a reserved address on the auxiliary bus associated with an initiator device.

8. The computer program product of claim 7 wherein the program code for modifying the RESELECTION signal comprises:

F.1 program code for converting the reserved address in the RESELECTION signal to the address of the initiator device on the main bus.

9. A bus extender apparatus for operatively coupling a main SCSI bus to an auxiliary SCSI bus, the main bus having at least one initiator device operatively coupled thereto, each of the at least one initiator device accessible by an address on the main bus, the auxiliary bus having at least one target device operatively coupled thereto, the target device supporting tagged queuing and the target device accessible by an address on the auxiliary bus, the apparatus comprising:

A. a memory device for storing therein, for each initiator device having access to the auxiliary bus, a reserved address on the auxiliary bus;

B. means for detecting a main bus SELECTION signal asserted by an initiator device on the main bus, the main bus SELECTION signal including an initiator address field containing the address of the initiator device which asserts the main bus SELECTION signal;

C. means for modifying the SELECTION signal to form a modified SELECTION signal including a modified initiator address field containing the address of the initiator device which asserts the main bus SELECTION signal; and D. means for asserting the modified SELECTION signal on the auxiliary bus.

10. The apparatus of claim 9 further comprising:

E. means for detecting a RESELECTION signal asserted on the auxiliary bus by a target device;

F. means for modifying the RESELECTION signal; and

G. means for asserting the modified RESELECTION signal on the main bus.

11. The apparatus of claim 10 wherein the data identifying the RESELECTION signal comprises the reserved address from memory associated with the initiator device.

12. The apparatus of claim 11 wherein the means for modifying the RESELECTION signal comprises:

means for converting the reserved address in the RESELECTION signal to the address of the initiator device on the main bus.

* * * * *